United States Patent [19]

Parvulescu et al.

[11] Patent Number: 5,802,460
[45] Date of Patent: Sep. 1, 1998

[54] TELEPHONE HANDSET WITH REMOTE CONTROLLER FOR TRANSFERRING INFORMATION TO A WIRELESS MESSAGING DEVICE

[75] Inventors: Adrian Parvulescu, Fish's Eddy, N.Y.; Andrew Todd Zidel, Hawthorne; Sophie Klym, Lincoln Park, both of N.J.

[73] Assignees: Sony Corporation, Tokyo, Japan; Sony Electronics Inc., Park Ridge, N.J.

[21] Appl. No.: 681,254

[22] Filed: Jul. 22, 1996

[51] Int. Cl.⁶ .................................................. H04B 1/38
[52] U.S. Cl. .................. 455/92; 455/556; 455/550; 455/419; 455/420; 11/31.3
[58] Field of Search .................. 455/556, 550, 455/419, 420, 31.3, 92

[56] References Cited

U.S. PATENT DOCUMENTS

| | | | |
|---|---|---|---|
| 5,138,649 | 8/1992 | Krisbergh et al. | 455/92 |
| 5,201,067 | 4/1993 | Grube et al. | 455/556 |
| 5,561,712 | 10/1996 | Nishira | 455/92 |

*Primary Examiner*—David R. Hudspeth
*Assistant Examiner*—Daniel Abebe
*Attorney, Agent, or Firm*—Lise A. Rode, Esq.; Jerry A. Miller

[57] ABSTRACT

A telephone handset and remote controller apparatus for transmitting information such as phone numbers and addresses for storing in a messaging device. The telephone handset and remote controller apparatus includes a housing and a plurality of actuators disposed on the housing for allowing information to be input into memory in the telephone handset and remote controller apparatus and to allow control of the operation of the telephone handset and remote controller apparatus. A radiofrequency transceiver included in the telephone handset and remote controller apparatus is responsive to the actuation of the actuators, and transmits a television control signal for controlling a television receiver in response to actuation of at least a first of the actuators, transmits a first radiofrequency signal for providing a radiofrequency communications link in response to actuation of at least a second of the actuators, and transmits to the messaging device, a second radiofrequency signal encoded with the information in response to actuation of at least a third of the actuators. The radiofrequency transceiver in the telephone handset and remote controller apparatus receives radiofrequency communication signals from an associated base station, and if the messaging device is bidirectional, also receives messaging signals from the messaging device. The telephone handset and remote controller apparatus may also have a data connector so that it may be connected to a computer in order to receive downloaded information such as software updates and the like and transmit such information to the messaging device.

20 Claims, 7 Drawing Sheets

TELEPHONE HANDSET WITH REMOTE CONTROLLER FOR TRANSFERRING INFORMATION TO A WIRELESS MESSAGING DEVICE

BACKGROUND OF INVENTION

1. Field of the Invention

The present invention relates to portable telephone handsets and remote controllers. (??). More particularly, the present invention relates to the transfer of information between a telephone handset and remote controller apparatus and a messaging device using radiofrequency energy.

2. General Background

Messaging systems have become quite popular in the recent past. Paging devices, in particular, have become popular given their compact size, ease of use and relatively low cost of operation.

Until recently, however, such communications systems were one-way; that is, a pager could receive incoming messages, but could not respond to same. Currently, two-way voice messaging systems having limited capabilities have been introduced on a commercial basis. Such two-way voice messaging systems allow the receiving terminal to respond to an incoming numeric or alphanumeric message by selecting and transmitting back to the transmitting terminal, one of several predetermined responses which are programmed into the receiving terminal's software. In the more distant future, however, true two-way voice messaging terminals are planned to be commercially introduced. In such true two-way voice messaging systems, it is anticipated that a user will be able to transmit a message to a receiving terminal which, in turn, will have the capability of responding to such transmitting terminal with a response voice message. One method of accomplishing this may be seen in U.S. patent application Ser. No. 08/573,624, "Two-Way Messaging System Having Speech-to-Text Converter" to Parvelescu et al., which is assigned to the assignee of the present invention and incorporated by reference herein.

Responses in the aforementioned two-way voice messaging systems have been accomplished in any of several ways. For example, in the case of the limited two-way voice messaging systems which allow the user only to transmit a predetermined response upon the receipt of an incoming message, jog shuttle or arrow keys may be used so that a user can scroll through the number of predetermined responses which are displayed on the paging device's display, select the desired response, and then actuate the jog shuttle, arrow key, or separate button/actuator to transmit the selected response. A disadvantage with such device is that the user is limited to selecting one of those responses which has been preprogrammed into the paging device during its manufacture. Such disadvantage will be addressed in true two-way voice messaging devices, where the user need only record his voice message prior to transmission.

In such true two-way voice messaging devices, however, it is expected that there will be a desire to input into the device's memory, new phone numbers/addresses, such as those most often used by the messaging device user, and thus there will still be a desire for some type of input device by which the user can enter such new phone numbers/addresses. It is anticipated that jog shuttle or arrow keys also may be used in these two-way messaging devices. For example, one method to enter new phone numbers/addresses would allow the user to actuate the jog shuttle or arrow keys to scroll through an alphanumeric listing and select the appropriate alphanumeric characters to form the desired phone number/address. Thereafter, storage of such phone number/address in the messaging device's memory would again be accomplished via the actuation of a jog shuttle, arrow key, or separate button/actuator. This method is cumbersome and time-consuming, however, particularly if there are a number of phone numbers/addresses to be stored. In an alternative method, a keypad, such as the 10-digit, 12-key keypad found on standard telephones, is provided on the face of the paging device so that the device's user could manually enter into the paging device's memory the phone number/address to be stored. As with the jog shuttle or arrow, the keypad is undesirable for at least two reasons. First, it adds complexity to the messaging device hardware. Additionally, provision of a keypad on the messaging device generally necessitates an increase in the size of the device in order to accommodate it, and this contravenes the user's desire and general consumer trend for the messaging device to remain compact. Furthermore, the undesirability of the keypad is exacerbated by the fact that, for the most part, it is unnecessary since it is only used to enter new phone numbers/addresses into the voice messaging device, and thus is used relatively infrequently.

One solution would be to provide a remote device into which could be entered desired numbers and addresses with subsequent transmission of such information to the wireless messaging device. Remote devices using infrared links for transferring information from one device to another are well known in the art. For example, in U.S. patent application Ser. No. 08/543,598, "System and Method for Transmitting Information from a Paging Device to a Receiver" to Akahane, and which is assigned to the assignee of the present invention, an infrared link is used to transmit data from a paging device to a receiver such as a personal digital assistant (PDA). The disadvantages with providing an infrared (IR) remote controller for transmitting information to and from a messaging device is two-fold. First, as is well-known to those skilled in the art, a device which uses an infrared link for communications requires line-of-sight operation, thus limiting the range and versatility of the device. In addition, while a remote device addresses the aforementioned hardware complexity and messaging size concerns, it requires the user to carry an additional, albeit portable, device. This is undesirable in an age where the user is already likely to be carrying numerous other portable devices such as PDA's, palmtop computers, and cellular phones, thereby encumbering the user, and increasing the likelihood of loss or misplacement of any or all of the devices.

It would therefore be desirable to provide an efficient and uncumbersome way to download information such as phone numbers and addresses into a messaging device using a remote communications link which would limit the additional hardware required in the messaging device and thus limit the increase in the size of the device, and which further would be more versatile than the infrared remote devices currently proposed. The apparatus and method of the present invention achieves such advantages by using radiofrequency links for completion of telephonic communications, control of a television receiver, and for remote transmission of information into a wireless messaging device.

SUMMARY OF THE INVENTION

Accordingly, it is one object of the present invention to provide a method and apparatus to input information into a messaging device which has no keypad.

It is another object of the present invention to provide a method and apparatus to input information into a keypad-less messaging device without significantly increasing the complexity or amount of additional hardware required in the messaging device, and thus the size of the messaging device.

It is yet another object of the present invention to provide an efficient and uncumbersome method and apparatus to input information such as phone numbers and addresses into a messaging device using a remote communications link.

It is still another object of the present invention to provide a method and apparatus to input information into a keypad-less messaging device using a RF communications link.

Yet another object of the invention is to reduce the number of portable devices a user must carry by providing a multifunction apparatus which can be used to establish telephonic communications, remotely control a television receiver, and transmit information such as phone numbers and addresses into a keypad-less messaging device, all of which may be realized through the use of an RF communications link.

In one embodiment of the present invention, information is transferred from a telephone handset and remote controller apparatus to a messaging device by inputting the information to be transferred into a memory in the telephone handset and remote controller apparatus, coding a radiofrequency signal with the information, and then transmitting the radiofrequency signal to the messaging device. The radiofrequency signal is received in the messaging device, decoded to provide the information in the messaging device, and then stored in a second memory in the messaging device. Before the step of transmitting the radiofrequency signal to the messaging device, an identifier and messaging number associated with the messaging device may be input into the telephone handset and remote controller apparatus, and then transmitted to the messaging device.

In another embodiment of the present invention, the messaging device is a two-way messaging device, and transmits an acknowledgment signal back to the telephone handset and remote controller apparatus each time it successfully receives a signal, including the information, from the telephone handset and remote controller apparatus.

In yet another embodiment of the present invention, the telephone handset and remote controller apparatus includes a housing, a plurality of actuators disposed on the housing for inputting information and for controlling the operation of the telephone handset and remote controller apparatus, and a first memory for storing the information. A radiofrequency transmitter which is responsive to actuation of the actuators transmits a television control signal for controlling a television receiver in response to actuation of at least a first of the plurality of actuators, transmits a first radiofrequency signal for providing a radiofrequency communications link in response to actuation of at least a second of the plurality of actuators, and transmits to the messaging device, a second radiofrequency signal encoded with the information in response to actuation of at least a third of the plurality of actuators.

In still another embodiment of the present invention, a data connector in the telephone handset and remote controller apparatus is connected to a computer for receiving therefrom, information such as software applications and programs.

The features of the present invention believed to be novel are set forth with particularity in the appended claims. However, the invention itself may be best understood with reference to the following description in conjunction with the accompanying drawings.

DETAILED DESCRIPTION OF THE INVENTION

It is expected that two-way wireless messaging devices will operate in the bandwidth ranging between 896 and 901 MHZ for message transmission and 935 to 940 MHZ for message reception. Further, it is known that currently, existing cordless phones operate in a frequency bandwidth between 902 and 928 MHZ. In light of the close proximity of the devices' frequency ranges, and in view of the objects and goals set forth above, it was found desirable to combine a remote controller with a digital cordless handset in order to transfer information to a wireless messaging device.

Figure 1:
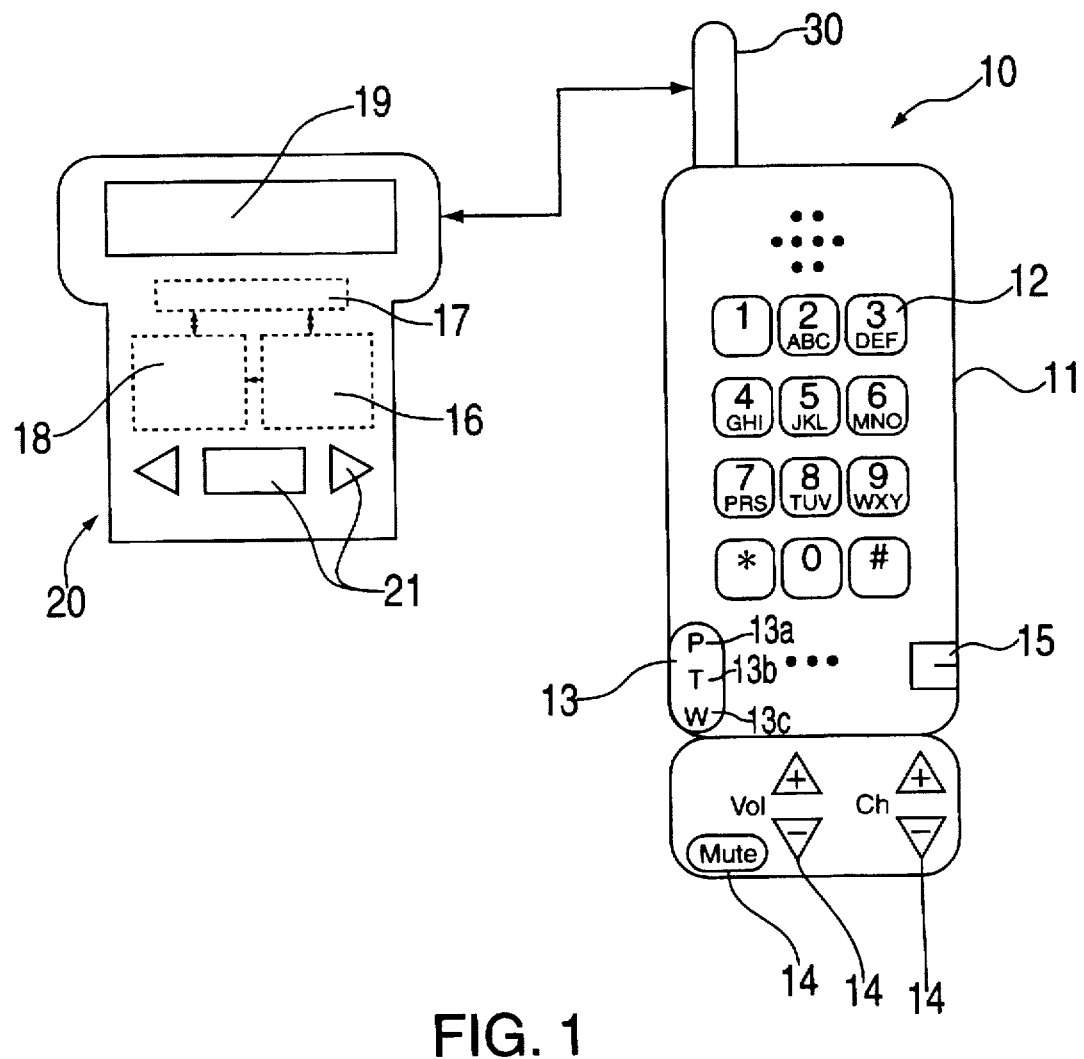
FIG. 1 shows a schematic of the telephone handset and remote controller apparatus and the wireless messaging device of the present invention.

One embodiment of the system of the present invention will be described with reference to FIG. 1. As seen therein, the system of the present invention includes a telephone handset and remote controller apparatus 10 for communications with a wireless messaging device 20. (Although FIG. 1 shows a bidirectional wireless messaging device 20—that is, a two-way messaging device—it will be understood to those skilled in the art that the invention is not so limited and wireless messaging device 20 may be a unidirectional, or receive-only messaging device). The telephone handset and remote controller apparatus 10 has a housing 11, and a slide switch or actuator 13 for selecting one of three modes: telephone mode (P) 13a, television mode (T) 13b, and voice messaging mode (W) 13c. A keypad 12 is provided for selection of the various numbers to be dialed during the telephonic operation of the telephone handset and remote controller apparatus 10 when the switch 13 is in telephone mode, and for providing remote control functions, such as channel selection, during the operation of the telephone handset and remote controller apparatus 10 in the remote control state when it is in television mode. The keypad 12 is also used to input into the telephone handset and remote controller apparatus 10 and a wireless messaging device 20 information, such as a new messaging number, which is to be transmitted and input into the wireless messaging device 20 of the present invention when the telephone handset and remote controller apparatus 10 and a wireless messaging device 20 is in voice messaging mode (W) 13c. While the keys of keypad 12 may simply have numbers thereon, each preferably includes alphanumeric characters, such as those found on standard telephones, in order that the user may also transmit messaging addresses or other information which requires alphabetic characters. In addition to the keypad 12, the telephone handset and remote controller apparatus 10 preferably also has several remote control actuators 14, such as found on standard television remote controllers, for volume control, channel selection, and the like.

Figure 2:
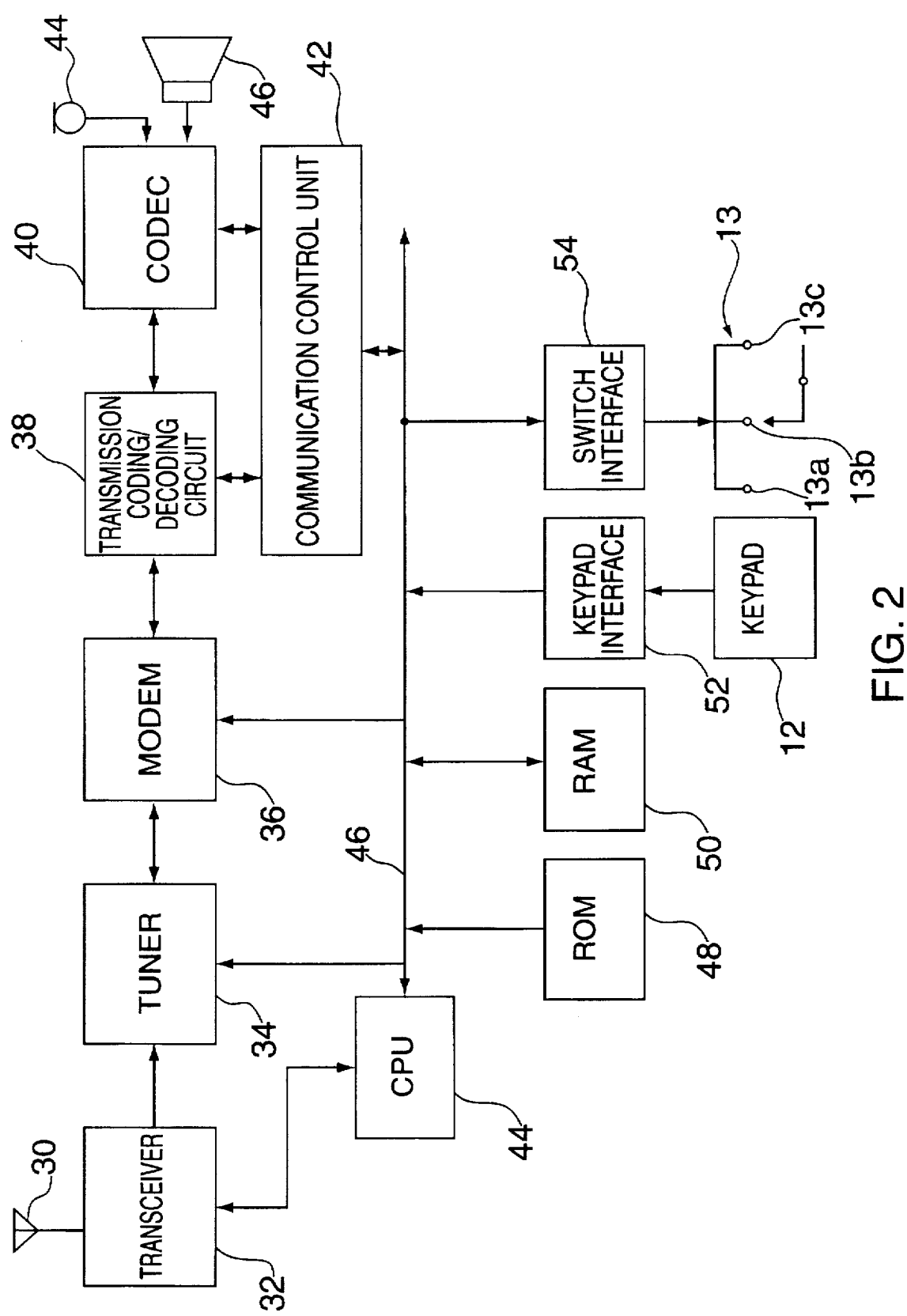
FIG. 2 shows a block diagram of the telephone handset and remote controller apparatus of the present invention.

The telephone handset and remote controller apparatus 10 of the present invention may be seen in more detail with reference to FIG. 2. As shown therein, the telephone handset and remote controller apparatus 10 includes an antenna 30, a RF transceiver 32 for receiving and transmitting digital audio signals, a tuner 34, a wireless (RF) interface including MODEM 36, a transmission coding/decoding protocol circuit 38, a coder/decoder (CODEC) 40, and a communications control unit 42. The telephone handset and remote controller apparatus 10 further includes a microphone 44 for receiving speech signals and for transmitting same during a telephone conversation, a transducer 46 for reproducing speech signals, a communication control unit 42, a central processing unit (CPU) 44 for controlling the overall operation of the telephone handset and remote controller apparatus 10, a communications bus 46, a read-only memory (ROM) 48 for storing software and firmware, a random access memory (RAM) 50, a keypad 12, keypad interface 50, and a battery (not shown). The telephone handset and remote controller apparatus 10 also has a mode selector switch 13 having at least three positions 13a, 13b, 13c, and a switch interface 54. In one embodiment of the present invention, the RAM 50 includes expanded RAM, and the telephone handset and remote controller apparatus 10 further includes a data connector 15 (FIG. 1) such as an RJ-11 data jack, in order that the telephone handset and remote controller apparatus 10 may be connected to a computer for the downloading of software updates and new applications from the computer into the telephone handset and remote controller apparatus 10.

Figure 3A:
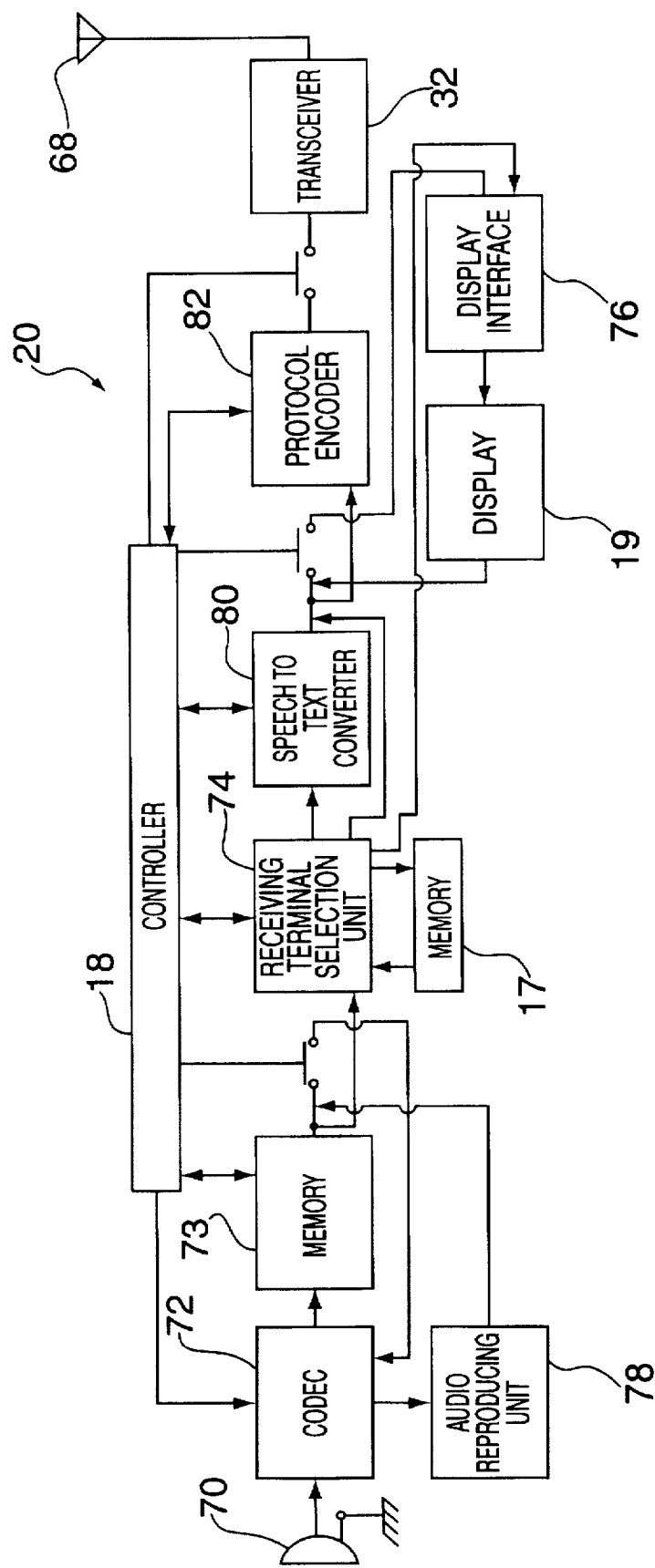
FIGS. 3a and 3b respectively illustrate one embodiment of the transmitting and receiving circuitry of the wireless messaging device of the present invention.
Figure 3B:
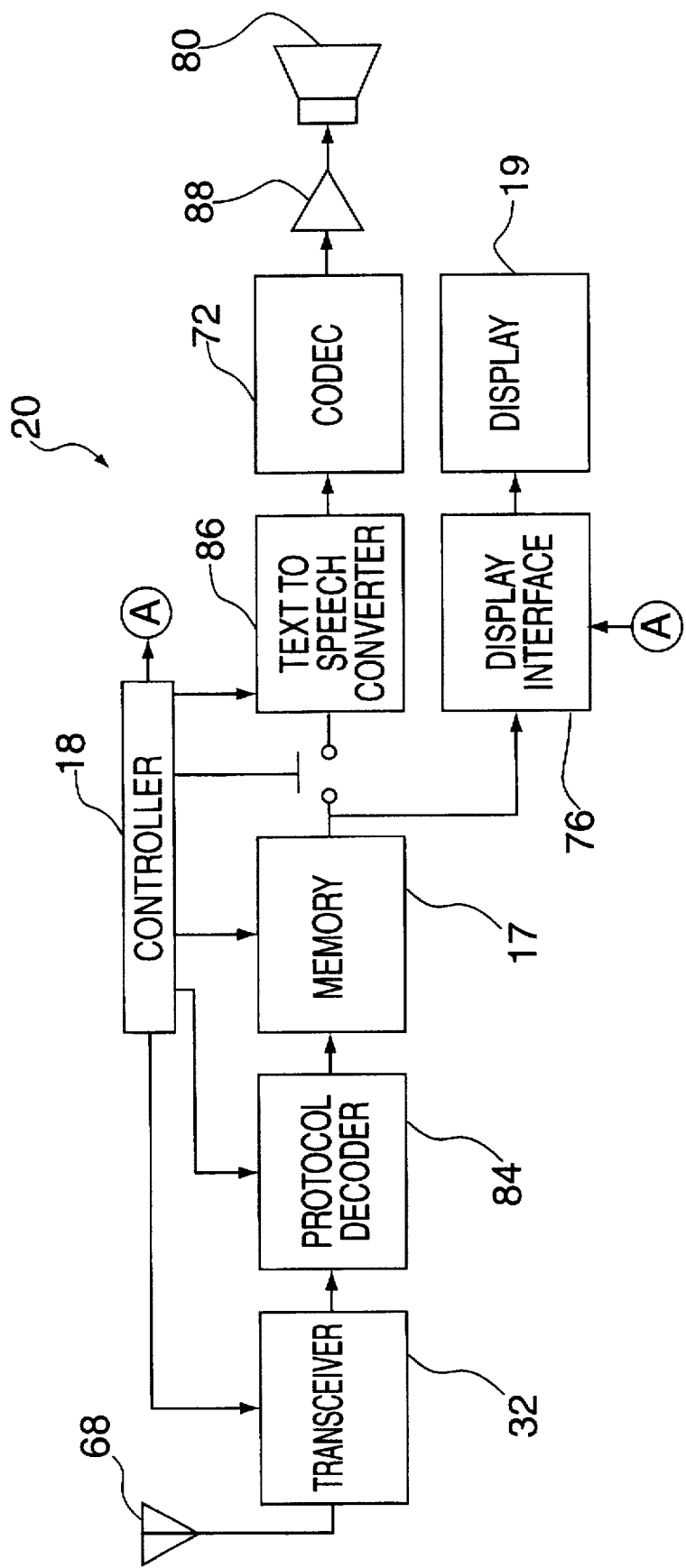

The wireless messaging device 20 preferably includes at least transceiver 32, memory (ROM and RAM) 17, controller 18, display 19, and actuators 21, the latter of which may be used to scroll through messages, phone numbers and the like, for display on display 19. (FIG. 1) One embodiment of the transmitting and receiving circuitry of the wireless messaging device 20 may be seen in more detail with reference to FIGS. 3a and 3b, respectively. The transmitting circuitry of FIG. 3a preferably includes antenna 68, microphone 70, CODEC 72, memory 73, receiving terminal selection unit 74, audio reproducing unit 78, speech to text converter 80, protocol encoder 82 and the transmitting portion of transceiver 32. The receiving circuitry of FIG. 3b preferably includes antenna 68, the receiving portion of transceiver 32, protocol decoder 84, text to speech converter 86, CODEC 72, preamplifier 88, and speaker 90. Operation of the wireless messaging device shown in FIGS. 3a and 3b is set forth in more detail in U.S. Ser. No. 08/573,624, "Two-Way Messaging Terminal Having a Speech-to-Text Converter" (Parvulescu et al.), filed on Dec. 18, 1995 and assigned to the assignee of the present invention. Such application is incorporated by reference herein, and will not be further discussed.

It is expected that the communications protocol used by the wireless messaging device 20 will preferably be that of the two-way Mobitex protocol designed by Ericsson/Eritel of Sweden. Such protocol requires 12.5 kHz channel bandwidth at 8 kbps Gaussian Minimum Shift Keying transmission scheme. The telephone handset and remote controller apparatus 10 will thus implement such protocol in order for it to communicate with the wireless messaging device 20. Thus, at least that portion of the Mobitex protocol concerning downloading of information and acknowledgment of message reception must be implemented in the CPU 44 of the telephone handset and remote controller apparatus 10. Additionally, as known in the art, RAM 50 must be of a sufficient memory capacity to be capable of handling such protocol. It will be understood that the invention is not limited to the Mobitex protocol, and other communications protocols may be used as known to those skilled in the art.

Operation of Telephone Handset and Remote Controller Apparatus in Telephone Mode When the switch 13 is placed in telephone mode (P) 13a, the telephone handset and remote controller apparatus 10 operates as a digital cordless phone. When transmitting a signal to or receiving a signal from a private base station (not shown) during a telephone call, the telephone handset and remote controller apparatus 10 operates in a manner as is known in the art, and therefore will only be briefly described herein. With reference to FIG. 2, when the telephone handset and remote controller apparatus 10 receives an FM signal from the private base station (not shown) at the antenna 30 and transceiver 32, it is supplied to the tuner 34. The FM signal is converted into a first intermediate frequency signal and then converted into a second intermediate frequency signal. The second intermediate frequency signal is supplied from the tuner 34 to the MODEM 36, in which it is FM-demodulated to provide a digital audio signal. The digital audio signal is then supplied through the transmission coding scheme unit 38 where it is decoded under the control of the communication control unit 42, to the CODEC 40, in which it is reconverted to provide the original analog signal. This analog audio signal is supplied to the transducer 46 and reproduced as an audio signal thereby. During the placement of an outgoing call from the telephone handset and remote controller apparatus 10, an FM signal is transmitted to the private base station (not shown) through transceiver 32 and antenna 30. An analog audio signal, such as a speech signal, is picked up by the microphone 44 and then supplied to the CODEC 40 where it is converted into a digital audio signal. Under the control of the communication control unit 42, the digital audio signal is supplied to transmission coding/decoding scheme unit 38. The thus processed signal is then supplied to the MODEM 36, where it is further converted into an FM intermediate frequency signal and fed to the tuner 34. The FM intermediate frequency signal supplied to the tuner 34 is frequency-converted into an FM signal, processed in a predetermined signal processing fashion and then fed to the antenna 30. Then, the FM signal is transmitted from the antenna 30 to the private base station (not shown).

Operation of Telephone Handset and Remote Controller Apparatus in Remote Control Mode Referring to FIG. 2, when the switch 13 is placed in television mode (T) 13b, the telephone handset and remote controller apparatus 10 operates as a remote controller, such as for controlling a television receiver. Upon actuation of any of the keys on keypad 12, the CPU 44 causes the ROM, in which is stored at least a control program for the remote controller, to read out the appropriate command signal to the MODEM 36, where it is modulated for radiofrequency transmission. The modulated signal is then supplied to the RF transceiver 32 where it is transmitted to the appropriate receiving device, such as a television receiver (not shown) which has an RF receiver and is thus capable of receiving an RF signal.

Figure 4:
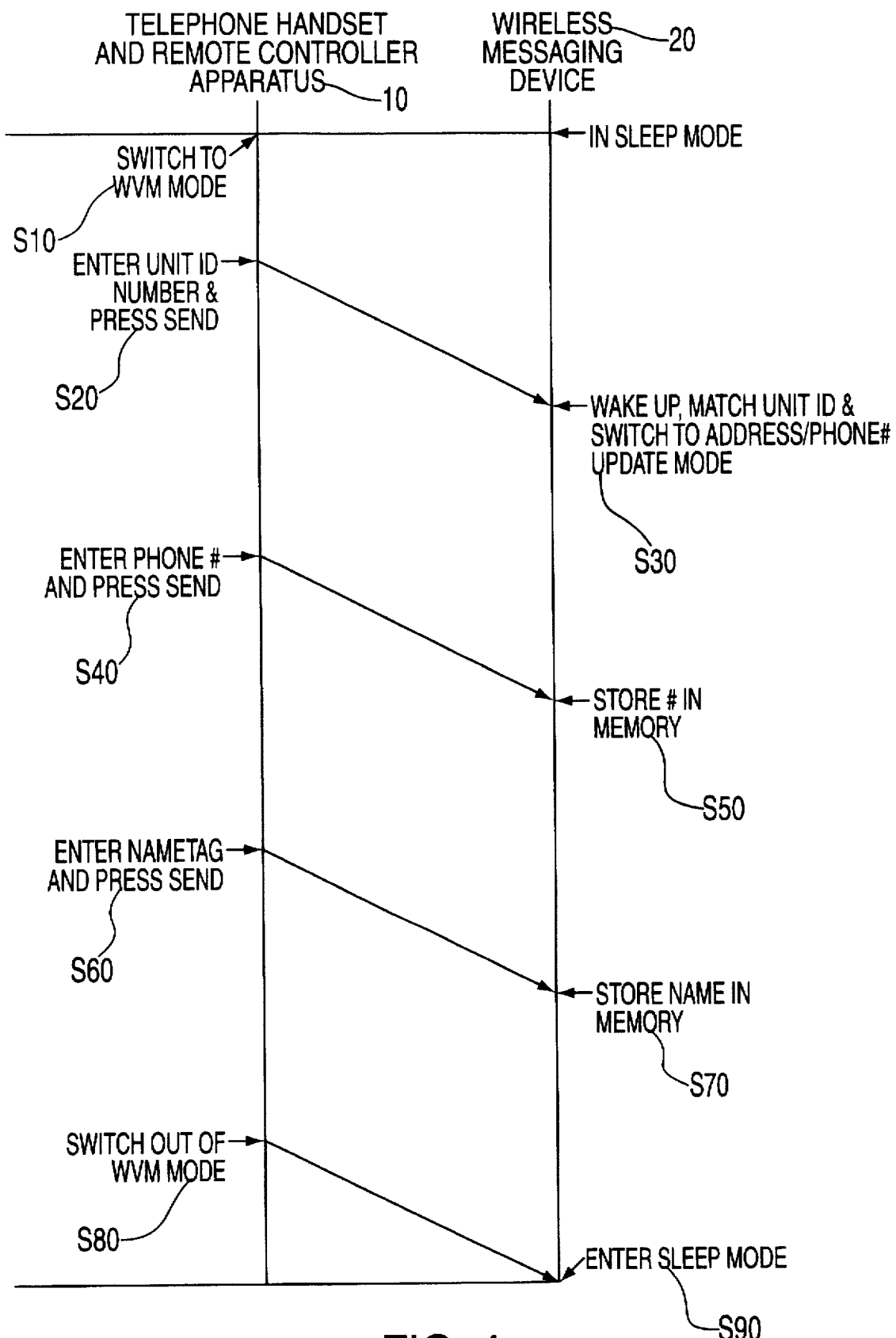
FIG. 4 is a diagram illustrating the communications path occurring between the telephone handset and remote controller apparatus and a unidirectional messaging device according to an embodiment of the present invention.

Operation of the Telephone Handset and Remote Controller Apparatus 10 in Wireless Messaging Mode Operation of the telephone handset and remote controller 10 and a unidirectional wireless messaging device 20 will be described with reference to FIGS. 2 and 4. As seen thereat, the switch 13 of the telephone handset and remote controller apparatus 10 is placed in the wireless messaging mode at step S10. During this time, the wireless messaging device 20 is in "sleep" mode, pending receipt of any incoming messages. Before transmitting the desired information to the wireless messaging device 20 at step S40, the user preferably enters into the telephone handset and remote controller apparatus 10 through keypad 12, the messaging device unit identification number and phone number associated with the targeted messaging device 20, where it is appropriately coded for transmission via a radiofrequency signal by the wireless interface/MODEM 36. The thus coded information is transmitted by the RF transceiver 32 to the wireless messaging device 20 at step S20. At step S30, as the wireless messaging device 20 receives the messaging device unit identification number and phone number at its RF transceiver 16, it is placed in an active or "wake" state, where a controller 17 therein (shown in dashed lines in FIG. 1) compares the received messaging device unit identification number and phone number with that unit's identification number and phone number stored in the device's memory 18. If the controller 17 determines the received and stored messaging device unit identification number and phone number to be identical, the controller 17 causes the wireless messaging device 20 to be placed in a receive state where it is capable of receiving the new information which will be transmitted from the telephone handset and remote controller 10. Once the wireless messaging device 20 is placed in the receive state at step S30, the user enters the new phone number/address which he desires to store in the messaging device 20 into the telephone handset and remote controller apparatus 10 through keypad 12, and thereafter transmits same, by actuating a separate transmit button (not shown) or one or more of the keys on the keypad 12 (step S40). The transceiver 16 in messaging device 20 receives such information at step S50, wherein the controller 17 causes the information to be stored in the device's memory 18. In a preferred embodiment, the user can also append a nametag to be associated with the newly stored phone number/address, by using the letters associated with the keys on keypad 12 to enter such nametag in a manner similar to that for entering the phone number/address, and then to transmit this information to the wireless messaging device 20 (step S60). Again, similar to that of step S50, the transmitted nametag is received and stored in the wireless messaging device 20 (step S70). After the transfer of all information is complete, the user can place the telephone handset and remote controller 10 out of the wireless messaging mode by actuating switch 13 (step S80). As known in the art, if the messaging device 20 receives no further messages or information after a preset time, it will be returned to the "sleep" mode (step S90).

Figure 5:
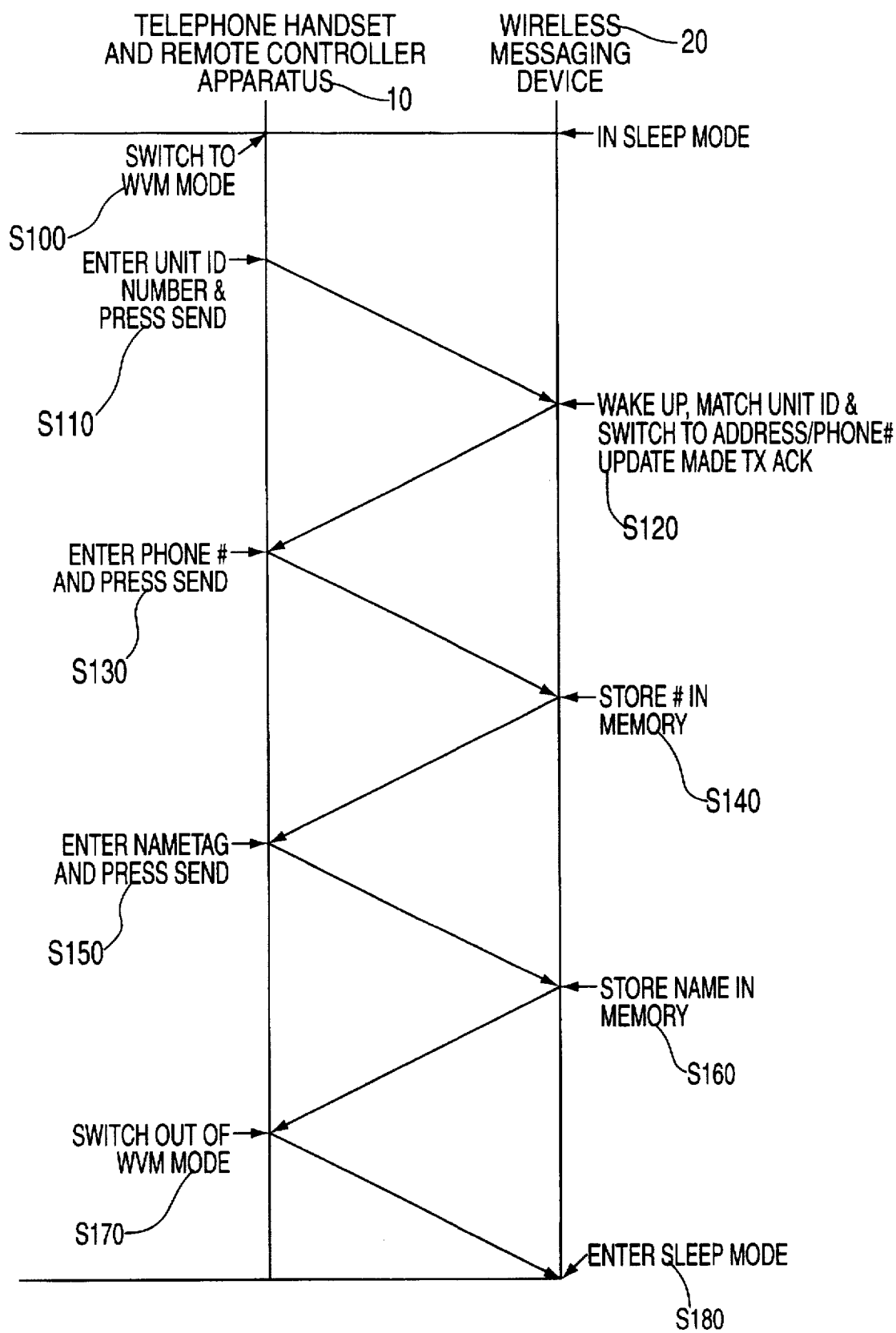
FIG. 5 is a diagram illustrating the communications path which occurs between the telephone handset and remote controller apparatus and a two-way messaging device according to an embodiment of the present invention.

If the wireless messaging device 20 is bidirectional, i.e., two-way, operation of the telephone handset and remote controller 10 and a bidirectional wireless messaging device is similar to the operation with unidirectional device. As seen in FIG. 5, the switch 13 of the telephone handset and remote controller apparatus 10 is again placed in the wireless messaging mode at step S100. Again, the wireless messaging device 20 is in "sleep" mode at this time. Before transmitting the desired information to the wireless messaging device 20 at step S130, the user preferably enters the messaging device unit identification number and phone number associated with the targeted messaging device 20, and transmits same to the device 20 (step S110). When the wireless messaging device 20 receives the messaging device unit identification number and phone number, it is placed in an active or "wake" state, where the controller therein compares the received and stored messaging device unit identification and phone numbers (step S120). If the controller 17 determines the received and stored messaging device unit identification number and phone number to be identical, as discussed above with respect to the one-way messaging device 20, the controller 17 causes the two-way wireless messaging device 20 to be placed in a receive state where it is capable of receiving the new information which will be transmitted from the telephone handset and remote controller 10. In addition, at step S120, the two-way messaging device 20 transmits an acknowledgment signal back to the telephone handset and remote controller 10 to indicate that the numbers have in fact been successfully received. (The method of transmission of such acknowledgment signal is well known to those skilled in the art of two-way messaging devices and will not be discussed further here.) Once the wireless messaging device is placed in the receive state and sends an acknowledgment signal at step S120, the steps are similar to that discussed with respect to the one-way messaging device 20 as discussed above. Thus the user enters the new phone number/address which he desires to store in the two-way messaging device 20 and thereafter transmits same at step S130. The transceiver 16 receives and stores such information at step S140. Again, the user can also append a nametag to be associated with the newly stored phone number/address and then transmit this information to the wireless messaging device 20 (step 150), where it is stored in memory 18 (step S160). After the transfer of all information is complete, the user can place the telephone handset and remote controller 10 out of the wireless messaging mode by actuating switch 13 (step S170). Again, if the messaging device 20 receives no further messages or information after a preset time, it will be returned to the "sleep" mode (step S180).

In one embodiment of the present invention, the telephone handset and remote controller 10 includes expanded RAM in RAM 50 and has a data connector 15, such as and RJ-11 jack, (FIG. 1) so that the telephone handset and remote controller 10 may be connected to a computer (not shown) for the downloading of information such as software updates and new applications into the telephone handset and remote controller 10 into the expanded RAM (RAM 50). This is particularly advantageous, as it allows the removal of excess traffic from the messaging network.

Figure 6:
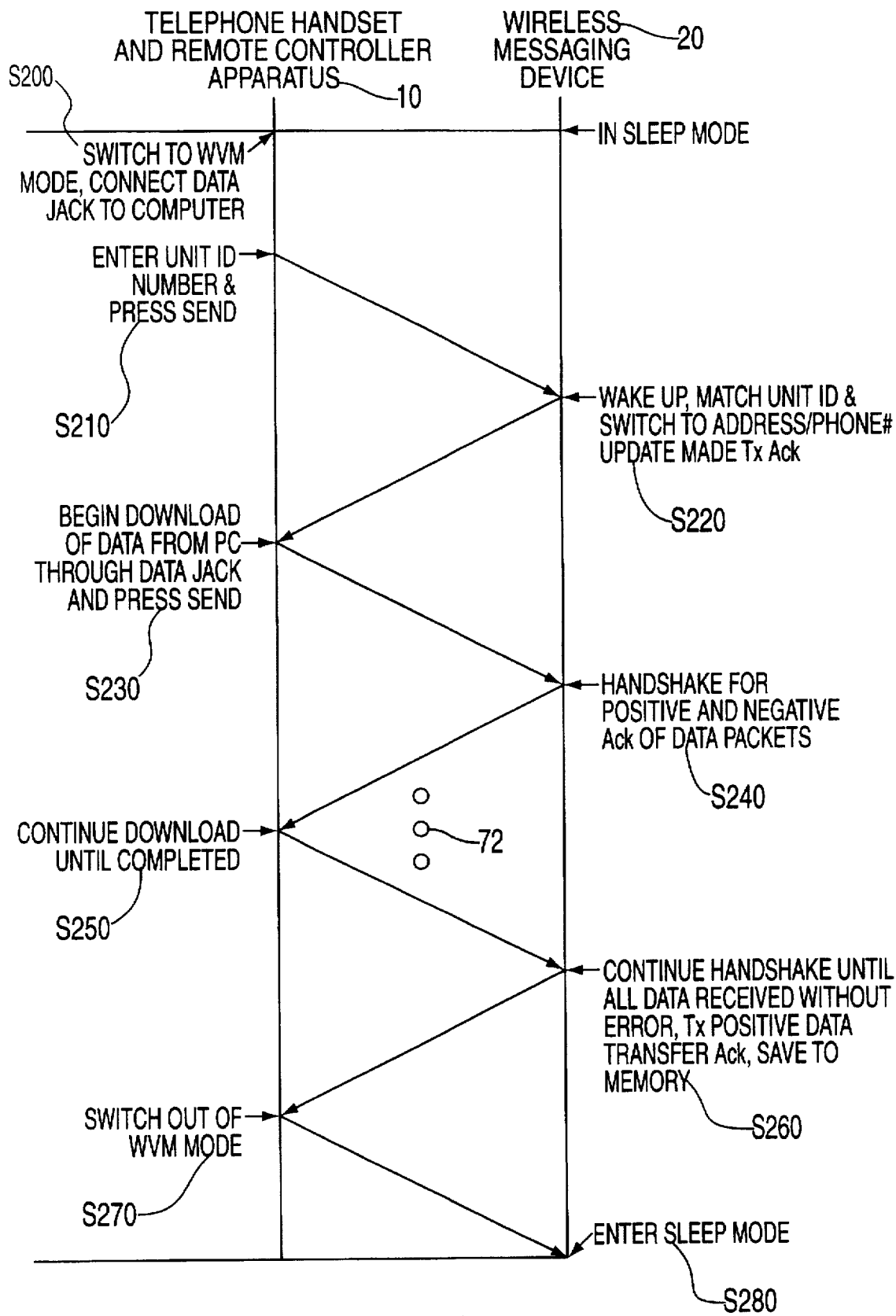
FIG. 6 is a diagram illustrating the communications path which occurs when information is downloaded from a computer connected to the telephone handset and remote controller apparatus and such information is transmitted from the telephone handset and remote controller apparatus to a messaging device according to another embodiment of the present invention.

In operation, and with reference to FIG. 6, the data jack 15 is connected to the computer (not shown) and the switch 13 of the telephone handset and remote controller apparatus 10 is placed in the wireless messaging mode at step S200. The user enters the messaging device unit identification number and phone number associated with the targeted messaging device 20 into the telephone handset and remote controller 10, and transmits same to the device 20 (step S210), where the wireless messaging device 20 receives the messaging device unit identification number and phone number, is placed in a receive state where it is capable of receiving the new information which will be transmitted from the telephone handset and remote controller 10 (step S220). Once the wireless messaging device 20 is placed in the receive state at step S230, it transmits an acknowledgment signal back to the telephone handset and remote controller 10 to indicate that the numbers have in fact been successfully received (step S220). At step S230, the user can begin to download the subject information from the computer (not shown) through the data jack 15 into the telephone handset and remote controller 10. The user may then transmit the data from the telephone handset and remote controller 10 to the wireless messaging device 20. Preferably this is accomplished by way of data packets using a data packet protocol as known in the art. In a preferred embodiment, upon receipt in the wireless messaging device 20 of a data frame, the first data packet is stored in a buffer memory (not shown) in the transceiver 32 of the wireless messaging device 20, and then a handshake between the telephone handset and remote controller 10 and the wireless messaging device 20 is completed for the positive or negative acknowledgment of the data packets (step S240). As known to those skilled in the art, during the handshake process, a data "frame" is transmitted, decoded, stored in a buffer memory and error checked for integrity (using such processes as CERC). Upon completion of these steps, a positive acknowledgment ("ACK") signal or negative acknowledgment ("NAK") signal is transmitted from the wireless messaging device 20 back to the telephone handset and remote controller 10 depending upon whether the "frame" was successfully and correctly received in the wireless messaging device 20. A data frame may be either a data packet or a burst of multiple data packets (a "window") depending upon, among other things, the clarity of the data channel and risk of transmission error in the data channel. In light of the expected close proximity of the telephone handset and remote controller 10 to the wireless messaging device 20 during the downloading process, and thus low risk of transmission error, the data frame which will be transmitted will preferably be a "window". However, the present invention is not so limited, and the handshake process may be completed after each data packet.

Upon receipt of the positive or negative acknowledgment of the data packets in the telephone handset and remote controller 10, another data packet is downloaded from the computer (not shown) through the data jack 15 into the telephone handset and remote controller 10 and transmitted therefrom (step S250). Upon receipt in the wireless messaging device 20 of the next data packet a handshake between the telephone handset and remote controller 10 and the wireless messaging device 20 is again completed for the positive or negative acknowledgment of the data packets. (Such handshake process is known to those skilled in the art, and will not be described further here). As shown in FIG. 6, this process is continued n times until all the information is downloaded and transmitted to the wireless messaging device 20. Once all of the information is downloaded and transmitted, and the handshake for this last portion of information has occurred, the wireless messaging device 20 transmits a positive data transfer acknowledgment signal to the telephone handset and remote controller 10 and saves all of the downloaded information in memory 18 (step 260). After the transfer of all information is complete, the user can place the telephone handset and remote controller 10 out of the wireless messaging mode by actuating switch 13 (step S270). As known in the art, if the messaging device receives no further messages or information after a preset time, it will be returned to the "sleep" mode (step S280).

It is apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. For example, while the subject invention will be hereafter discussed in relation to two-way voice messaging devices, it is not so limited, and may be applied to unidirectional messaging devices as well as non-voice messaging devices. Additionally, while the keys of keypad 12 may simply have numbers thereon, each preferably includes alphanumeric characters, such as those found on standard telephones. Other embodiments will occur to those skilled in the art. Accordingly, it is intended that the present invention embrace all such alternatives, modifications and variations as fall within the scope of the appended claims.

What is claimed is:

1. A method of transferring information from a telephone handset and remote controller apparatus to a messaging device, comprising the steps of:

inputting said information into a first memory in said telephone handset and remote controller apparatus, said information to be transferred to said messaging device;

coding a radio frequency signal with said information to provide a coded radio frequency signal;

transmitting said coded radio frequency signal to said messaging device;

receiving said coded radio frequency signal in said messaging device;

decoding said coded radio frequency signal to provide said information in said messaging device; and, storing said information in a second memory in said messaging device.

2. The method of claim 1, further comprising the steps of:

inputting an identifier and messaging number associated with said messaging device; and, transmitting said identifier and messaging number associated with said messaging device, wherein said identifier and messaging number associated with said messaging device are input and transmitted to said telephone handset and remote controller apparatus before the step of transmitting said coded radio frequency signal to said messaging device.

3. The method of claim 1, wherein said telephone handset and remote controller apparatus includes actuator means for inputting said information into said first memory.

4. The method of claim 3, wherein said actuator means comprises a keypad.

5. The method of claim 1, wherein said information comprises a list of telephone/messaging device phone numbers.

6. The method of claim 1, wherein said telephone handset and remote controller apparatus is connected to receive said information downloaded from a computer, and wherein said inputting step comprises downloading said information from said computer to said telephone handset and remote controller apparatus.

7. The method of claim 1, wherein said messaging device is a two-way voice messaging device.

8. A method of transferring information, including first and second information, from a telephone handset and remote controller apparatus to a two-way messaging device, comprising the steps of:

inputting said first information into a first memory in said telephone handset and remote controller apparatus, said first information to be transferred to said two-way messaging device;

coding a radiofrequency signal with said first information to provide a coded radio frequency signal;

transmitting said coded radio frequency signal to said two-way messaging device;

receiving said coded radio frequency signal in said two-way messaging device;

decoding said coded radio frequency signal to provide said first information in said two-way messaging device; and, storing said first information in a second memory in said two-way messaging device.

9. The method of claim 8, further comprising the steps of:

transmitting an acknowledgment signal from said two-way messaging device to said telephone handset and remote controller apparatus after said step of storing said first information in a second memory in said two-way messaging device.

10. The method of claim 9, further comprising the steps of:

inputting said second information into said first memory in said telephone handset and remote controller apparatus, said second information to be transferred to said two-way messaging device;

coding a radiofrequency signal with said second information to provide a coded radio frequency signal;

transmitting said coded radio frequency signal to said two-way messaging device;

receiving said coded radio frequency signal in said two-way messaging device;

decoding said coded radio frequency signal to provide said second information in said two-way messaging device;

storing said second information in a second memory in said two-way messaging device;

transmitting an acknowledgment signal from said two-way messaging device to said telephone handset and remote controller apparatus.

11. The method of claim 8, further comprising the steps of:

inputting an identifier and messaging number associated with said two-way messaging device;

transmitting said identifier and said messaging number associated with said two-way messaging device;

receiving said transmitted identifier and said transmitted messaging number associated with said messaging device in said two-way messaging device;

comparing said transmitted identifier with an identifier stored in said second memory of said two-way messaging device;

placing said two-way messaging device into a state wherein said two-way messaging device is capable of receiving said first information; and, transmitting an acknowledgment signal from said two-way messaging device to said telephone handset and remote controller apparatus, wherein after receiving said acknowledgment signal, said first information inputting step occurs.

12. A system for transferring information to a messaging device, comprising in combination:

a telephone handset and remote controller apparatus including:

a housing;

switch means disposed on said housing for placing said telephone handset and remote controller apparatus in one of a plurality of modes;

a first memory for storing said information;

a keypad including a plurality of keys disposed on said housing for inputting said information into said first memory and for controlling the operation of said telephone handset and remote controller apparatus;

radiofrequency transmitter means responsive to actuation of said actuator means, said radiofrequency transmitter means transmitting a television control signal for controlling a television receiver when said switch means is in a first of said plurality of modes and at least one of said plurality of keys on said keypad is actuated, transmitting a first radiofrequency signal for providing a radiofrequency communications link when said switch means is in a second of said plurality of modes and at least one of said plurality of keys on said keypad is actuated, and transmitting to said messaging device, a second radiofrequency signal encoded with said information when said switch means is in a third of said plurality of modes and at least one of said plurality of keys on said keypad is actuated;

and, said messaging device including:

radiofrequency receiver means for receiving said second radiofrequency signal encoded with said information; and, a second memory for storing said information.

13. The system of claim 12, wherein said telephone handset and remote controller apparatus communicates with a remote base station, further comprising:

a microphone for receiving a speech message and converting said speech message into an analog electrical signal and for providing said analog electrical signal to said radiofrequency transmitter means;

a radiofrequency receiver for receiving from said remote base station, a third radiofrequency signal through said communications link; and, a transducer for reproducing said received third radiofrequency signal as an audible signal.

14. The system of claim 13, wherein said messaging device further comprises:

a display for displaying said information; and, actuator means for controlling the display of said information.

15. The system of claim 13, wherein said messaging device is a two-way voice messaging device.

16. The system of claim 15, wherein said radiofrequency receiver further receives a fourth radiofrequency signal transmitted from said two-way voice messaging device, and said transducer reproduces said received fourth radiofrequency signal as an audible signal.

17. A telephone handset and remote controller apparatus for communicating with a messaging device, comprising:

a housing;

a plurality of actuators disposed on said housing for inputting information and for controlling the operation of said telephone handset and remote controller apparatus;

a first memory for storing said information; and, radiofrequency transmitter means responsive to actuation of said actuator means, said radiofrequency transmitter means transmitting a television control signal for controlling a television receiver in response to actuation of at least a first of said plurality of actuators, transmitting a first radiofrequency signal for providing a radiofrequency communications link in response to actuation of at least a second of said plurality of actuators, and transmitting to said messaging device, a second radiofrequency signal encoded with said information in response to actuation of at least a third of said plurality of actuators.

18. The telephone handset and remote controller apparatus of claim 17, further comprising:

a microphone for receiving a speech message and converting said speech message into an analog electrical signal and for providing said analog electrical signal to said radiofrequency transmitter means;

a radiofrequency receiver for receiving from said remote base station, a third radiofrequency signal through said communications link; and, a transducer for reproducing said received third radiofrequency signal as an audible signal.

19. The telephone handset and remote controller apparatus of claim 18, wherein said radiofrequency receiver further receives a fourth radiofrequency signal transmitted from said two-way voice messaging device and said transducer reproduces said received fourth radiofrequency signal as an audible signal.

20. The telephone handset and remote controller of claim 17, further including a data connector for receiving said information downloaded from a computer.

* * * * *